(12) United States Patent
Botros et al.

(10) Patent No.: US 8,197,947 B2
(45) Date of Patent: Jun. 12, 2012

(54) ADHESIVE COMPOSITIONS

(75) Inventors: Maged G. Botros, Liberty Township, OH (US); Charles S. Holland, Springboro, OH (US)

(73) Assignee: Equistar Chemicals, LP, Houston, TX (US)

( * ) Notice: Subject to any disclaimer, the term of this patent is extended or adjusted under 35 U.S.C. 154(b) by 379 days.

(21) Appl. No.: 12/592,701

(22) Filed: Dec. 1, 2009

(65) Prior Publication Data
US 2011/0129667 A1 Jun. 2, 2011

(51) Int. Cl.
*B32B 27/32* (2006.01)
*C09J 123/06* (2006.01)
*C09J 123/08* (2006.01)
*C09J 123/18* (2006.01)
*C09J 151/06* (2006.01)

(52) U.S. Cl. .............................. 428/523; 525/70; 525/74
(58) Field of Classification Search .................. 428/523; 525/70, 74
See application file for complete search history.

(56) References Cited

U.S. PATENT DOCUMENTS

| 4,087,587 | A | | 5/1978 | Shida et al. |
| 4,298,712 | A | | 11/1981 | Machonis, Jr. et al. |
| 4,487,885 | A | | 12/1984 | Adur et al. |
| 4,774,144 | A | | 9/1988 | Jachec et al. |
| H568 | H | * | 1/1989 | Tanaka et al. .................. 525/71 |
| 5,367,022 | A | | 11/1994 | Kiang et al. |
| 7,687,575 | B2 | | 3/2010 | Lee et al. |
| 2007/0167568 | A1 | | 7/2007 | Gerbaulet et al. |

FOREIGN PATENT DOCUMENTS

WO 2009/017588 2/2009

* cited by examiner

*Primary Examiner* — Jeffrey Mullis

(57) ABSTRACT

Adhesive compositions comprising a first copolymer of butene-1 and propylene; a second copolymer of ethylene and a comonomer selected from butene-1, hexene-1, and octene-1; a polyolefin grafted with an ethylenically unsaturated carboxylic acid or acid derivative; and an olefin polymer resin, and multilayer structures comprising the adhesive composition.

14 Claims, No Drawings

US 8,197,947 B2

ADHESIVE COMPOSITIONS

FIELD OF THE INVENTION

The invention relates to adhesive compositions comprising a first copolymer of butene-1 and propylene; a second copolymer of ethylene and butene-1, hexene-1 or octene-1; a polyolefin grafted with an ethylenically unsaturated carboxylic acid or acid derivative; and an olefin polymer resin.

BACKGROUND OF THE INVENTION

Composite materials are increasingly important as construction components in the building and storage industries. They offer flexibility in design while avoiding durability and weight issues characteristic of conventional materials such as wood and wood products. By combining the advantages of a variety of materials in their core and facing layers, composite materials can be designed and fabricated to optimize price and performance.

Fabrication of composite systems, however, requires bonding various layers together. This is particularly a concern when bonding adjacent dissimilar materials. For example, in multilayer films tie layers produced from adhesive composition layers are typically positioned between the dissimilar layers to be bonded, and the layers then adhered by conventional means. Other applications require good adhesion between a metal and an adjacent layer. For example, nail guns often use nail-collation tape to load nails into the gun, where the nails are adhered to the tape using an adhesive layer. Still other applications include wire and cable, where an aluminum wire must be adhered to the outer layer of low density polyethylene. In composite multilayer pipe applications, an aluminum interior layer is often sandwiched between interior and exterior layers of polypropylene, polyethylene or cross-linked polyethylene. In these structures, adhesive composition layers are required between the polyolefins and aluminum.

Various adhesive compositions have been proposed. For example, functionalized polyolefins have been combined with a base polymer or high ethylene content materials such as ethylene-propylene copolymers or ethylene-propylene-diene terpolymers, for example as described in U.S. Pat. Nos. 4,087,587, 4,298,712, 4,487,885, 4,774,144, and 5,367,022. Additionally, propylene elastomer-containing material has been disclosed in U.S. Publ. No. 2008/0032148. However, a continuing need exists for compositions providing superior levels of adhesion for today's demanding applications. It has unexpectedly been found that compositions comprising a first copolymer of butene-1 and propylene, a second copolymer of ethylene and a comonomer selected from butene-1, hexene-1 and octene-1; a polyolefin grafted with an ethylenically unsaturated carboxylic acid or acid derivative; and an olefin polymer resin exhibits superior adhesion performance.

SUMMARY OF THE INVENTION

The present invention relates to an adhesive composition comprising a first copolymer comprising 85 to 99 wt % butene-1 and 1 to 15 wt % propylene; a second copolymer comprising 45 to 85 wt % ethylene and 15 to 55 wt % of a comonomer selected from butene-1, hexene-1 or octene-1; 2 to 20 wt % of a polyolefin grafted with an ethylenically unsaturated carboxylic acid or acid derivative; and 20 to 93 wt % of an olefin polymer resin different from the first and second copolymers and the grafted polyolefin, wherein the sum of the first copolymer and the second copolymer is 5 to 60 wt % based on the amount of adhesive compositions, and the weight ratio of the first copolymer to the second copolymer is 0.3 to 3.

DETAILED DESCRIPTION OF THE INVENTION

The adhesive compositions of the invention comprise a first copolymer comprising butene-1 and propylene; a second copolymer comprising ethylene and a comonomer of butene-1, hexene-1 or octene-1; a polyolefin grafted with an ethylenically unsaturated carboxylic acid or acid derivative; and an olefin polymer resin different than the first and second copolymers and the grafted polyolefin.

First and Second Copolymers

The adhesive compositions of the invention comprise a first copolymer comprising 85 to 99 wt % butene-1 and 1 to 15 wt % propylene, and a second copolymer comprising 45 to 85 wt % ethylene and 15 to 55 wt % of a comonomer selected from butene-1, hexene-1 or octene-1. The weight ratio of the first copolymer to the second copolymer is 0.3 to 3. Preferably, the weight ratio of the first copolymer to the second copolymer is 0.4 to 2.5, more preferably 0.5 to 2.2. The first copolymer preferably comprises 90 to 98 wt % of butene-1 and 2 to 10 wt % of propylene. The second copolymer preferably comprises 45 to 60 wt % ethylene and 40 to 55 wt % of the comonomer, more preferably 47 to 57 wt % ethylene and 43 to 53 wt % of the comonomer. Preferably, the comonomer is octene-1.

The first copolymer preferably has a melt flow rate (MFR), as measured by ASTM D1238; 230° C.; 2.16 kg, of 0.1 to 10 dg/min., preferably 0.2 to 5 dg/min.; and a flexural modulus, as measured by ASTM D790-92 of at most 65 MPa, preferably at most 50 MPa, more preferably at most 40 MPa. The first copolymer preferably has a crystallinity, as measured by wide angle x-ray diffraction of 10 to 25%, and a melting enthalpy after ten days of aging at room temperature preferably of less than 45 J/g, more preferably from 8 to 30 J/g.

The second copolymer preferably has an MFR of 0.2 to 10, more preferably 0.3 to 5 dg/min., most preferably from 0.4 to 1.5 dg/min., and a density of 0.85 to 0.90 g/cm$^3$.

Grafted Polyolefin

The grafted polyolefin contains acid or acid derivative functionality, and is obtained by reacting ethylenically unsaturated carboxylic acids and carboxylic acid anhydrides, or derivatives thereof, with polyethylene or polypropylene under grafting conditions. The grafting monomers, i.e., acid, anhydride or derivative, are incorporated along the polyethylene or polypropylene backbone. When the grafted polyolefin is obtained by grafting polyethylene, the polyethylene to be grafted includes ethylene homopolymers and copolymers of ethylene with propylene, butene, 4-methyl pentene, hexene, octene, or mixtures thereof. When the grafted polyolefin is obtained by grafting polypropylene, the polypropylene to be grafted includes propylene homopolymers and copolymers of propylene with ethylene or $C_4$-$C_{10}$ α-olefins. Preferably, the grafted polyolefin is obtained by grafting polyethylene. More preferably, the polyethylene to be grafted is HDPE or LLDPE. Most preferably, the polyethylene to be grafted is HDPE.

Carboxylic acids or anhydrides useful as grafting monomers include compounds such as acrylic acid, maleic acid, fumaric acid, citaconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride 2-oxa-1,3-diketospiro(4,4)non-7-ene, bicyclo (2.2.1)hept-5-ene-2,3-dicarboxylic acid or anhydride, tetrahydrophthalic acid or anhydride, x-methylbicyclo(2.2.1) hept-5-ene-2,3-dicarboxylic acid or anhydride, nadic anhydride, methyl nadic anhydride, himic anhydride, and methyl himic anhydride. Maleic anhydride is a particularly useful grafting monomer. Acid and anhydride derivatives which can be used to graft the polyethylene or polypropylene include dialkyl maleates, dialkyl fumarates, dialkyl itaconates, dialkyl mesaconates, dialkyl citraconates and alkyl crotonates.

Grafting is accomplished by thermal and/or mechanical means in accordance with known procedures, with or without a free-radical generating catalyst such as an organic peroxide, where the grafted sample is prepared by heating a mixture of the polyolefin and graft monomer(s), with or without a solvent, while subjecting it to high shear. Preferably, the grafted products are prepared by melt blending the polyethylene or polypropylene in the substantial absence of a solvent, in the presence of the grafting monomer in a shear-imparting reactor, such as an extruder. Twin screw extruders such as those marketed by Werner-Pfleiderer under the designations ZSK-30, ZSK-53, ZSK-83, ZSK-90 and ZSK-92 are especially useful for carrying out the grafting operation. Preferably, the amount of acid or acid derivative comonomer(s) grafted onto the polyethylene or polypropylene ranges from 0.1 to 4 weight percent, preferably from 0.5 to 3.0 weight percent. Preferably, when maleic anhydride is grafted onto HDPE or LLDPE, the grafted maleic anhydride concentration is 0.5 to 4 weight percent. Melt indexes of the grafted ethylene polymers (MIs) as measured by ASTM D 1238, at 190° C., 2.16 kg, are preferably 1 to 20 dg/min.

The grafting reaction is carried out at a temperature selected to minimize or avoid rapid vaporization and consequent losses of the graft monomer and any catalyst that may be employed. The graft monomer concentration in the reactor is typically about 1 to about 5 wt % based on the total reaction mixture weight. A temperature profile where the temperature of the polyolefin melt increases gradually through the length of the extruder/reactor up to a maximum in the grafting reaction zone and then decreases toward the reactor exit is preferred. The maximum temperature within the reactor should be such that significant vaporization losses and/or premature decomposition of any peroxide catalyst are avoided. The grafting monomer and any catalyst used are preferably added in neat form to the extruder/reactor.

Olefin Polymer Resin

The olefin polymer resin useful in the adhesive compositions can be a propylene polymer, ethylene polymer or mixtures thereof, provided that it is different than the first and second copolymers and the grafted polyolefin. When the olefin polymer resin is a propylene polymer, it is selected from propylene homopolymers, random copolymers or impact copolymers of propylene comprising up to 30 wt % of comonomers selected from ethylene or $C_{4-8}$ α-olefins. When the olefin polymer resin is a propylene polymer, preferably it is a propylene homopolymer having a crystallinity, as measured by wide angle x-ray diffraction, of greater than 40%, or propylene copolymers preferably comprising from 1 to 10 wt %, more preferably, from 1 to 5 wt % ethylene. The propylene polymer MFR's are typically 0.1 to 100 dg/min., preferably, 5 to 50 dg/min.

When the olefin polymer resin is an ethylene polymer, it is preferably selected from ethylene homopolymers, ethylene copolymers or mixtures thereof, where the comonomer is chosen from propylene, $C_{4-8}$ α-olefins, vinyl carboxylates, acrylic and methacrylic acids and esters, or mixtures thereof. Ethylene homopolymers and ethylene-$C_{4-8}$ α-olefin copolymers include very low density polyethylene (VLDPE), low density polyethylene (LDPE), linear low density polyethylene (LLDPE), medium density polyethylene (MDPE) and high density polyethylene (HDPE). VLDPE is defined as having a density of 0.860 to 0.910 g/cm³, as measured by ASTM D 792. LDPE and LLDPE are defined as having densities in the range 0.910 to 0.930 g/cm³. MDPE is defined as having a density of 0.930 to 0.945 g/cm³. HDPE is defined as having a density of at least 0.945 g/cm³, preferably, from 0.945 to 0.969 g/cm³. The ethylene homopolymers and copolymers typically have MI's from 0.01 to 400 dg/min, preferably, from 0.1 to 200 dg/min., more preferably from 1 to 100 dg/min.

Preferably, the olefin polymer resin is selected from ethylene homopolymers, ethylene copolymers with propylene, ethylene copolymers with $C_{4-8}$ α-olefins or mixtures thereof. Preferably, the olefin polymer resin has a crystallinity, as measured by either wide angle x-ray diffraction, of greater than 30 wt %. More preferably, the olefin polymer resin is HDPE having a crystallinity greater than 50 wt %, preferably greater than 55 wt %, or LLDPE having a crystallinity greater than 40%, preferably greater than 45 wt %, or mixtures of HDPE and LLDPE.

Adhesive compositions of the invention comprise 2 to 20 wt % grafted polyolefin; 20 to 93 wt % of an olefin polymer resin; and a first copolymer and a second copolymer, where the sum of the percentages of the first and second copolymers is 5 to 60 wt % based on the amount of adhesive composition. Preferably, the adhesive composition comprises 5 to 15 wt % of the grafted polyolefin; 40 to 75 wt % of the olefin polymer resin; and the sum of the percentages of the first and second copolymers is 20 to 45 wt % based on the amount of adhesive composition. More preferably, the adhesive composition comprises 6 to 12 wt % grafted polyolefin; 43 to 74 wt % olefin polymer base resin; and the sum of the percentages of the first and second copolymers is 20 to 45 wt % based on the amount of adhesive composition.

Additives, Stabilizers, and Fillers

The adhesive compositions of the invention can further comprise additives such as stabilizers, UV absorbers, metal deactivators, thiosynergists, peroxide scavengers, basic co-stabilizers, acid scavengers, nucleating agents, clarifiers, conventional fillers, dispersing agents, plasticizers, lubricants, emulsifiers, pigments, flow-control agents, optical brighteners, flame-proofing agents, antistatic agents, blowing agents, and mixtures thereof, which can be added in amounts well known to those skilled in the art.

The adhesives can be prepared by any conventional method well known to those skilled in the art, where combination of the components can be conducted in any sequence. For example, all of the components can be first melt blended in conventional blending equipment, with the blended material then being extruded. Alternately, some of the components can be blended prior to extrusion, with the remainder of the components being introduced after blending but upstream of the extruder, or at the extruder itself. The components can also be combined in a series of extrusion steps.

Multilayer Structures

The adhesive compositions of the invention can be used in a variety of applications for bonding polyolefins, various other polymers, metals, fiberglass, paper, glass, and wood to produce multilayer structures. For example, the compositions may be used as tie-layers for bonding one or more polyolefins, ionomers, epoxys, polyesters, polyamides, ethylene-vinyl alcohol copolymers and metal layers in multi-layer films. The polyolefins can include ethylene and propylene homopolymers and copolymers of ethylene with $C_{3-8}$ alpha-olefins, alkyl (meth)acrylates and vinyl carboxylates. Representative resins of this type include, but are not limited to, LDPE, LLDPE, HDPE, polypropylene, ethylene-vinyl acetate copolymer (EVA), ethylene-methyl acrylate copolymer (EMA) and ethylene-n-butyl acrylate copolymer (EnBA). Polybutylene terephthalate and polyethylene terephthalate are examples of useful polyester resins. Typical polyamides can include nylon 6, nylon 6,6, nylon 12, nylon 6,12 and nylon 6,66. Ethylene vinyl alcohol (EVOH) obtained by the saponification/hydrolysis of EVA is also a highly useful resin to impart barrier properties, particularly for film applications. The adhesive tie layers for film can be used in lamination, extrusion and coextrusion processes, e.g., blown or cast film extrusion/coextrusion, sheet extrusion/coextrusion, extrusion/coextrusion lamination, extrusion/coextrusion coating, injection blow molding, melt thermoforming and the like for flexible structures.

The adhesive compositions can also be used in rigid and semi-rigid containers having structural layers, as commonly used for food packaging or food storage applications. A typical construction of this type would include one or more food contact or sealing layers, a barrier layer and one or more structural layers. Food contact/sealing layers often comprise non-polar polyolefins, e.g., LDPE, while typical barrier layers comprise substrates of EVOH polyamides or the like. Structural layers may comprise polyolefins or styrene polymers which may also comprise rubber. Polystyrene and high impact polystyrene (HIPS) are widely used as structural layers, given their desirable physical properties, ease of extrusion processing, thermoforming and cutting.

The adhesive compositions can be used in the fabrication of multilayer pipes. Typically, these systems include polyolefin/adhesive/metal or EVOH/adhesive/polyolefin structures. Preferably, the systems include PEX/adhesive/metal, EVOH/adhesive/PEX, polyethylene/adhesive/metal or EVOH/adhesive/polyethylene structures, where PEX is crosslinked polyethylene.

The adhesive compositions can also be used to bond polyolefins or other materials to metals such as aluminum, steel, copper, brass, stainless steel, galvanized steel and the like. The metals can be bonded to an adjacent layer on one or both sides. Preferably, a polyolefin core layer is positioned between two outer metal layers, with the adhesive compositions serving as the tie layer between the polyolefin and the metal. These types of systems are widely used in metal lamination for composite building panels and composite truck-trailer panels. Preferably, the core layer is polyethylene. Most preferably, the core layer is HDPE, LLDPE or LDPE. The core layer polyolefin can comprise additives and fillers well known in the art to provide the properties necessary for a particular application, e.g., anti-oxidants, UV stabilizers, fire retardants and foaming agents.

Preferably, the adhesive compositions are used to adhere polyolefins to metal. More preferably, the adhesive compositions are used to adhere polyolefins to aluminum.

In each of these structures and their associated applications, physical and mechanical properties are dependent on the strength of the bond between the adhesive layer and the adjacent layer(s) to which it is bonded. Inadequate adhesion can result in delamination and loss of structural integrity.

The following examples illustrate the invention; however, those skilled in the art will recognize numerous variations within the spirit of the invention and scope of the claims.

Adhesive compositions of the examples were prepared using the following olefin polymer base resin, grafted polyolefin, and first and second copolymer components:

| | |
|---|---|
| BR-1 | HDPE having a density of 0.951 g/cm$^3$ and an MI of 12 dg/min., commercially available from Equistar Chemicals LP. |
| Mgraft-1 | HDPE grafted with 1.9 wt % maleic anhydride, having an MI of 9.5 dg/min and a density of 0.952 g/cm$^3$, produced by Equistar Chemicals LP. |
| Elast-1 | A copolymer comprising 96.1 wt % $C_4$ and 3.9 wt % $C_3$, having a melt flow 0.45 dg/min, a flexural modulus of 31 MPa, a crystallinity of 29%, and a melting enthalpy after 10 days of 17 J/g, commercially available from Basell USA Inc. |
| Elast-2 | EXACT 5062, an ethylene-octene copolymer having an ethylene content of 51 wt %, a density of 0.860 g/cm$^3$ and an MI of 1.1 dg/min., commercially available from ExxonMobil Chemical. |
| Elast-3 | A copolymer comprising 84 wt % $C_3$ and 16 wt % $C_2$ having a density of 0.862 g/cm$^3$ and melt flow of 1.3 dg/min. commercially available from ExxonMobil Chemical. |
| Adt-1 | Irganox-1010, commercially available from Ciba Chemical Company. |
| Adt-2 | Irgafos-168, commercially available from Ciba Chemical Company. |

Roller Peel Adhesion Testing

EXAMPLE 1

A 5-mil cast adhesive film was prepared by first melt blending in a ZSK-18 extruder an adhesive composition comprising 10 wt % Elast-1, 10 wt % Elast-2, 10 wt % Mgraft-1, 69.87 wt % BR-1, 0.065 wt % Adt-1 and 0.065 wt % Adt-2, and then extruding the blended mixture in a Killion KL-100 extruder having a temperature profile of 145° C., 155° C., 160° C. and 170° C.

A roller peel adhesion test was conducted by preparing 6"×6" panels of aluminum, adhesive and HDPE and placing them in a structure corresponding to Al/Tie/HDPE/Tie/Al, where Al is a 22 mil aluminum layer, Tie is the adhesive film and HDPE is a 270 mil layer of a commercially available 0.96 high density polyethylene. The film panel structure was compression molded at 400° F. and 40 psig for 40 seconds, and then cooled to room temperature at 40 psig. Adhesion of the aluminum sheet to the HDPE core was determined in accordance with ASTM D3167. Adhesion was measured as 34.4 lb/in.

COMPARATIVE EXAMPLE 2

An adhesive composition comprising 19.5 wt % Elast-1, 10 wt % Mgraft-1, 70.4 wt % BR-1, 0.05 wt % Adt-1, and 0.05 wt % Adt-2, was melt blended and extruded into an adhesive film as in Example 1. Roller peel testing was then conducted using the adhesive film as in Example 1. Adhesion was measured as 15.2 lb/in.

COMPARATIVE EXAMPLE 3

An adhesive composition comprising 10.0 wt % Elast-2, 10 wt % Elast-3, 10 wt % Mgraft-1, 69.9 wt % BR-1, 0.065 wt % Adt-1, and 0.065 wt % Adt-2, was melt blended and extruded into an adhesive film as in Example 1. Roller peel testing was then conducted using the adhesive film as in Example 1. Adhesion was measured as 17.2 lb/in.

Heat Seal Adhesion Testing

EXAMPLE 4

An adhesive composition identical to Example 1 was prepared by melt blending the components in a ZSK-18 extruder. A cast adhesive film having a thickness of 6 mils was prepared from the blended adhesive composition on a Killion K-100 extruder. The adhesive film and a 22 mil aluminum strip were cut into 1.5"×3" coupons, and a sample arranged, where the top layer was the adhesive film and the bottom layer was the aluminum. The bars of a Sentinel heat sealer were preheated before heat sealing, by closing the heat-sealing bars for three seconds with only the top bar heated. The sample was then heat sealed at 450° F. and 40 psig for a dwell time of three seconds. Following heat sealing, the coupons were cut into 1"×3" coupons for adhesion testing. Adhesion was determined on the heat-sealed sample by ASTM method D1876 in an Instron tensile tester, by measuring the force required to separate the layers in a T-Peel configuration at a cross head speed of 10 in/minute. Adhesion was measured as 2.45 lb/in.

EXAMPLE 5

An adhesive composition was prepared by melt blending 20 wt % Elast-1, 10 wt % Elast-2, 10 wt % Mgraft-1, 59.87 wt % BR-1, 0.065 wt % Adt-1 and 0.065 wt % Adt-2 as in Example 4. The blended material was heat sealed and adhesion testing conducted as in Example 4. Adhesion was measured as 4.38 lb/in.

EXAMPLE 6

An adhesive composition was prepared by melt blending 10 wt % Elast-1, 20 wt % Elast-2, 10 wt % Mgraft-1, 59.87 wt % BR-1, 0.065 wt % Adt-1 and 0.065 wt % Adt-2 as in Example 4. The blended material was heat sealed and adhesion testing conducted as in Example 4. Adhesion was measured as 3.88 lb/in.

EXAMPLE 7

An adhesive composition was prepared by melt blending 20 wt % Elast-1, 20 wt % Elast-2, 10 wt % Mgraft-1, 49.87 wt % BR-1, 0.065 wt % Adt-1 and 0.065 wt % Adt-2 as in Example 4. The blended material was heat sealed and adhesion testing conducted as in Example 4. Adhesion was measured as 3.80 lb/in.

EXAMPLE 8

An adhesive composition was prepared by melt blending 15 wt % Elast-1, 30 wt % Elast-2, 10 wt % Mgraft-1, 44.87 wt % BR-1, 0.065 wt % Adt-1 and 0.065 wt % Adt-2 as in Example 4. The blended material was heat sealed and adhesion testing conducted as in Example 4. Adhesion was measured as 3.32 lb/in.

The present subject matter being thus described, it will be apparent that the same may be grafted or varied in many ways. Such modifications and variations are not to be regarded as a departure from the spirit and scope of the present subject matter, and all such modifications and variations are intended to be included within the scope of the following claims.

We claim:

1. An adhesive composition comprising:
   A) a first copolymer comprising 85 to 99 wt % butene-1 and 1 to 15 wt % propylene;
   B) a second copolymer comprising 45 to 85 wt % ethylene and 15 to 55 wt % of a comonomer selected from butene-1, hexene-1 or octene-1;
   C) 2 to 20 wt % of a polyolefin grafted with an ethylenically unsaturated carboxylic acid or acid derivative; and
   D) 20 to 93 wt % of an olefin polymer resin different from components A), B), and C),
   wherein the sum of the first and second copolymers is 5 to 60 wt % based on the amount of adhesive composition and the weight ratio of the first copolymer to the second copolymer is 0.3 to 3.

2. The adhesive composition of claim 1 wherein the sum of first and second copolymers is 20 to 45 wt % based on the amount of adhesive composition.

3. The adhesive composition of claim 1 wherein the weight ratio of the first and second copolymers is 0.4 to 2.5.

4. The adhesive composition of claim 3 wherein the weight ratio of the first and second copolymers is 0.5 to 2.2.

5. The adhesive composition of claim 1 wherein the first copolymer comprises 90 to 98 wt % of butene-1 and 2 to 10 wt % of propylene.

6. The adhesive composition of claim 1 wherein the second copolymer comprises 45 to 60 wt % ethylene and 40 to 55 wt % of the comonomer.

7. The adhesive composition of claim 1 wherein the comonomer is octene-1.

8. A multilayer structure comprising an adhesive layer and a second layer bonded to the adhesive layer, the adhesive layer comprises the adhesive composition of claim 1.

9. The multilayer structure of claim 8 wherein the sum of the first and second copolymers is 20 to 45 wt % based on the amount of adhesive composition.

10. The multilayer structure of claim 8 wherein the weight ratio of the first copolymer to the second copolymer is 0.4 to 2.5.

11. The multilayer structure of claim 10 wherein the weight ratio of the first copolymer to the second copolymer is 0.5 to 2.2.

12. The multilayer structure of claim 8 wherein the first copolymer comprises 90 to 98 wt % of butene-1 and 2 to 10 wt % of propylene.

13. The multilayer structure of claim 8 wherein the second copolymer comprises 45 to 60 wt % ethylene and 40 to 55 wt % of the comonomer.

14. The multilayer structure of claim 8 wherein the comonomer is octene-1.

* * * * *